United States Patent [19]
Takatori

[11] Patent Number: 5,181,228
[45] Date of Patent: Jan. 19, 1993

[54] SYSTEM AND METHOD FOR PHASE EQUALIZATION

[75] Inventor: Hiroshi Takatori, Sacramento, Calif.

[73] Assignee: Level One Communications, Inc., Folsom, Calif.

[21] Appl. No.: 596,220

[22] Filed: Oct. 12, 1990

[51] Int. Cl.$^5$ .............................................. H04B 1/10
[52] U.S. Cl. ...................................... 375/103; 375/14; 375/101; 364/724.01; 455/307
[58] Field of Search ........................ 375/14, 101, 103; 455/206, 295, 307; 333/176; 364/724.01

[56] References Cited

U.S. PATENT DOCUMENTS

| | | | |
|---|---|---|---|
| 3,697,689 | 10/1972 | Gibson | 375/14 |
| 3,792,356 | 2/1974 | Kobayashi et al. | 375/14 |
| 4,170,758 | 10/1979 | Tamburelli | 375/12 |
| 4,270,179 | 5/1981 | Sifford et al. | 364/724.2 |
| 4,283,788 | 8/1981 | Tamburelli | 375/11 |
| 4,412,341 | 10/1983 | Gersho et al. | 375/102 |
| 4,468,786 | 8/1984 | Davis | 375/11 |
| 4,520,489 | 5/1985 | Hogge, Jr. | 375/14 |
| 4,583,234 | 4/1986 | Ramadan | 375/11 |
| 4,658,368 | 4/1987 | Blais | 364/724.01 |
| 4,751,663 | 6/1988 | Yamazaki | 364/724.01 |
| 4,760,596 | 7/1988 | Agrawal et al. | 379/410 |
| 4,789,994 | 12/1988 | Randall et al. | 375/12 |
| 4,896,334 | 1/1990 | Sayar | 375/20 |
| 4,908,787 | 3/1990 | Dyer | 364/724.01 |

OTHER PUBLICATIONS

IEEE Journal on Selected Areas in Communications, Mar., 1984, vol. SAC-2, No. 2, pp. 314–323, Piet J. Van Gerwen, "Design Considerations for a 144 kbit/s Digital Transmission Unit for the Local Telephone Network".

*Primary Examiner*—Curtis Kuntz
*Assistant Examiner*—Young Tse
*Attorney, Agent, or Firm*—Merchant, Gould, Smith, Edell, Welter & Schmidt

[57] ABSTRACT

A phase equalizer in the receiver portion of a bi-directional communication system is disclosed equalizer for reducing precursor intersymbol interference without any substantial degradation in signal to noise ratio. The phase equalizer is implemented as a switched capacitor filter having a clock (switch) rate at least four times the data baud rate and a z-transfer function T(z) of a form:

$$T(z) = G * \frac{A - z^{-1}}{1 - B * z^{-1}}$$

wherein G, A, and B are fixed but adjustable coefficients.

5 Claims, 3 Drawing Sheets

SYSTEM AND METHOD FOR PHASE EQUALIZATION

FIELD OF THE INVENTION

This invention relates to a phase equalizer, and more particularly to a phase equalizer in a receiver of a bi-directional data communication system which substantially removes precursor intersymbol interference without any appreciable degradation in the signal to noise ratio of the desired signal.

BACKGROUND OF THE INVENTION

This invention relates to a cost effective integrated circuit implementation of a high performance transmitter/receiver (transceiver) for bi-directional data communication utilizing a twisted pair cable (two wire metallic cable), such as a digital subscriber loop (DSL). Exemplary, but not exclusive, is a transceiver in an integrated service digital network (ISDN) providing "basic access" service over a conventional telephone communication line. The American National Standard Institute (ANSI) specification for telecommunications (ANSI T1.601-1988) defines "basic access" as a standardized combination of access channels that constitute the access arrangement for the majority of ISDN users. Specifically it includes any of the following combinations of access channels:

a) one D-Channel
b) one B-Channel
c) two B-Channels & one D-Channel where a B-channel is a 64 kilobits per second channel that carries customer information, such as voice calls, circuit switch data, or packet switch data; a D-channel is an access channel carrying control or signaling information and optionally packetized information and telemetry. The D-channel has a capacity of 16 kilobits per second. Accordingly, the data rate transfer sum of two B-channels and one D-channel is equal to 144 kilobits per second. Problems arise on these high speed channels since data is transceived over a telephone voice communication channel having a narrow bandwidth and line insertion losses up to 50 dB.

The function of a transmitter in a bi-directional communication system is to put a sequence of pulses representing transmitted data on to the communication channel. In the U-interface of an ISDN, these pulses have four levels, encoded particularly in the so-called 2B1Q code (2 binary, 1 quaternary) recommended by the American National Standards Institute T1D1.3 specification.

The function of a receiver is to detect pulses being sent from the far end of the communication channel. Since the communication channel is only a two wire cable, transmit and receive pulses can be contemporaneous on the channel causing an echoing effect when the two interact. The echoing effect can be removed by an echo canceller using a replication or a portion thereof of the transmitted pulse and subtracting it from the received pulse, such as described in U.S. Pat. No. 5,084,866, issued Jan. 28, 1992 to Kenneth G. Buttle entitled "TRANSVERSAL FILTER ECHO CANCELLER" and the co-pending U.S. application Ser. No. 07/507,595, filed Apr. 10, 1990, to Kenneth G. Buttle et. al., entitled "NON-LINEAR ECHO CANCELLER", both of which are assigned to the assignee of the present invention and both of which are incorporated herein by reference. Subsequent to echo cancellation, the receiver determines at what time to sample incoming pulses in order to ascertain the correct pulse amplitude modulation (PAM) level encoded. Difficulties arise in detecting levels due to line attenuation and distortion which causes pulse energy of a particular data pulse to extend over several baud periods. Alternatively stated, the trailing or leading edge of one pulse symbol invades the time slot of the next symbol, complicating the task of determining the correct amplitude assigned to that baud. Interference of this type which results from symbols received prior to the symbol of interest is generally referred to as intersymbol interference.

U.S. Pat. No. 4,896,334 to Sayar, issued Jan. 23, 1990, herein incorporated by reference, suggests a method for inducing undershoot in the received symbol and detecting a zero crossing point occurring after the induced undershoot and sampling one baud (sample period) later. The precursor undershoot is necessary, or at least desirable to improve detection of the zero crossing point. When the undershoot is absent, the resulting flat portion impedes the detection of amplitude variations in the vicinity of zero crossing. In order for an accurate detection of zero crossing, the pulses must be significantly free from interference at or near the precursor undershoot. Complicating the detection in the zero crossing area is corruption due to the so called intersymbol interference which causes erroneous levels in the region between the undershoot and the sampling area. Intersymbol interference in the form of extension of the trailing edge of a data symbol into the symbol time of a following symbol is said to be postcursor intersymbol interference and interference in the form of extension of the leading edge of a data symbol into the symbol time of a preceding symbol is said to be precursor intersymbol interference. Postcursor intersymbol interference is usually dealt with by means of a decision feedback equalizer (DFE). Prior solutions in removing precursor intersymbol interference have utilized some form of a transversal filter. Realizing a transversal filter digitally requires digital multipliers and extensive support hardware, while an analog implementation of a transversal filter requires analog delay lines whose accuracy are difficult to maintain.

BRIEF SUMMARY OF THE INVENTION

According to the present invention, a transceiver circuit suitable for loop interface in a bi-directional data communication system is disclosed having a phase equalizer for reducing precursor intersymbol interference. The phase equalizer reduces precursor intersymbol interference without any appreciable degradation in the signal to noise ratio. The phase equalizer is implemented in metal oxide semiconductor (MOS) as a switched capacitor filter having a clock (switch) frequency of at least four times the symbol rate frequency and a z-domain transfer function T(z) of the form:

$$T(z) = G * \frac{A - z^{-1}}{1 - B * z^{-1}}$$

where $$A = \frac{C1}{C2}$$

$$B = \frac{C4}{C3 + C4}$$

$$G = \frac{-C2}{C3 + C4}$$

and C1, C2, C3, and C4 are realized with several unit and fractional capacitors. The switched capacitor filter phase equalizer takes advantage of the inherent density and uniformity of a monolithic MOS embodiment. The transfer function of the phase equalizer is completely determined by a precise crystal control clock and the ratio of MOS capacitors. Switched capacitor filters in MOS provide analog signal processing capability unavailable in any other monolithic technology, extending to integrated circuit transceivers the same cost and space savings associated with memories in micro-computers. Furthermore, a properly designed phase equalizer realized as a monolithic MOS switched capacitor filter exhibits transfer function characteristics that require no adjustment and are inherently stable over processing environment variations.

It is therefore an object of this invention to disclose a circuit and method known as a phase equalizer for removing precursor intersymbol interference from receive symbols in a bi-directional communication system implemented in MOS as a switched capacitor filter.

For a better understanding of the invention, as well as other objects and further features thereof, reference is made to the following detailed description of the preferred embodiment taken in conjunction with accompanying drawings.

BRIEF DESCRIPTION OF THE DRAWINGS

Referring now to the drawings in which like references numbers represent corresponding parts throughout.

DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Figure 1:
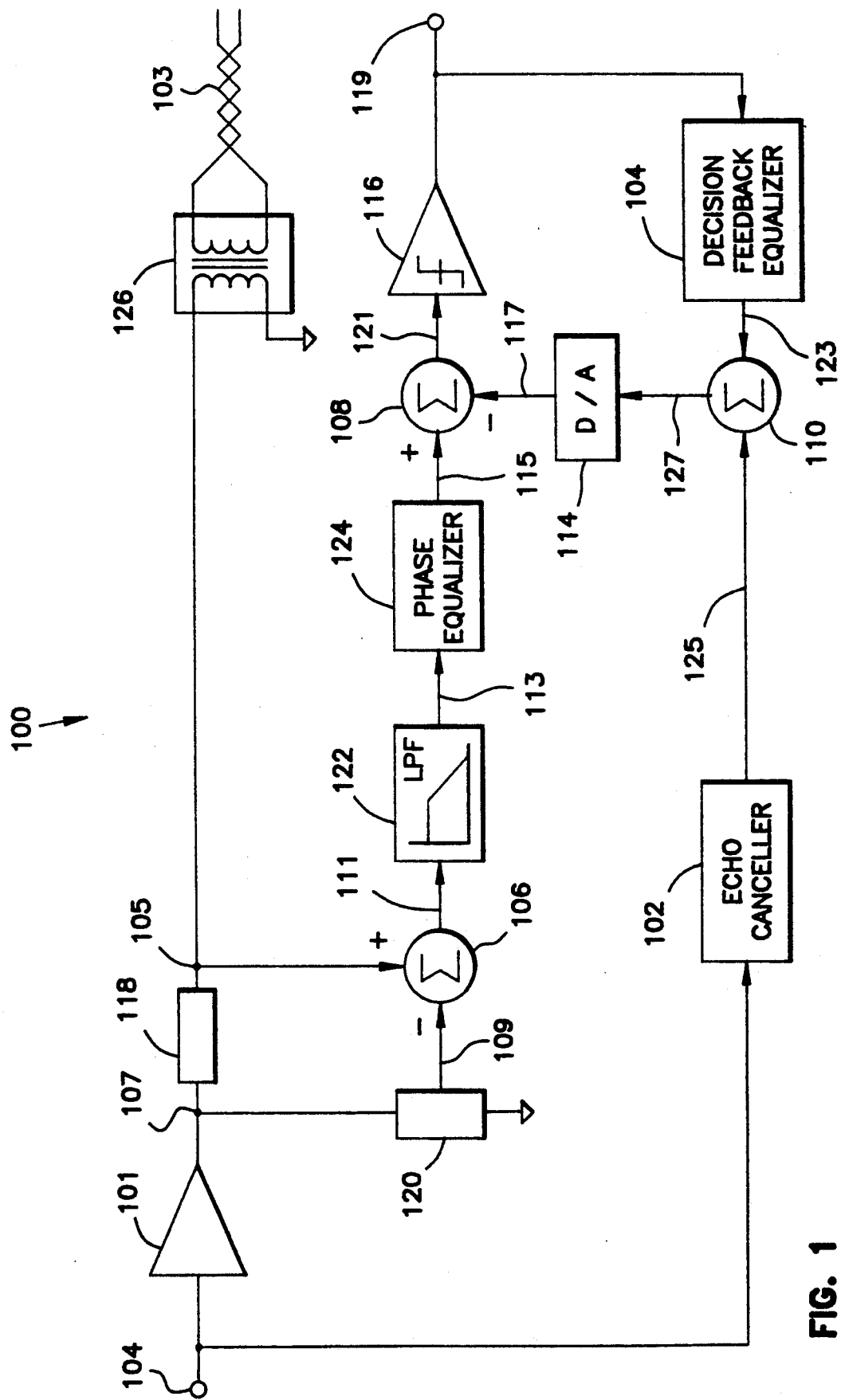
FIG. 1 is a simplified block diagram of a transceiver in a digital subscriber loop.

Referring to FIG. 1, a transceiver 100 in a digital subscriber loop is illustrated comprising a line driver 101 for driving the digital subscriber loop, an echo canceler 102, a decision feedback equalizer 104 for reducing postcursor intersymbol interference, a first summing means 106, a second summing means 108, a third summing means 110, a digital to analog converter 114, a comparator 116, a first impedance network 118, a second impedance network 120, low pass filter means 122, a phase equalizer 124 for reducing precursor intersymbol interference and a transformer 126 for isolating and coupling the transceiver 100 to a twisted pair cable 103. Data transmission occurs by applying a transmit signal to node 104 of the line driver 101. The output node 107 of line driver 101 is coupled to second impedance network 120 and to the transformer 126 through a first impedance network 118. Transformer 126 electrically isolates and couples node 105 to the twisted pair cable 103.

Data reception occurs by receiving a signal that is impressed from a remote location onto the twisted pair cable 103. The receive signal impressed on twisted pair cable 103 is isolated and coupled to node 105 through transformer 126. Node 105 comprises an electrical junction between a first end of first impedance network 118, a first input of first summing means 106 and a first terminal from the primary side of transformer 126. A second terminal from the primary side of transformer 126 is referenced to a common voltage reference. First impedance network 118 is selected to have an impedance value close to a line impedance reflected back by transformer 126. Assuming first impedance network 118 is substantially equal to the reflected line impedance, the voltage at node 105 is substantially one-half the voltage at line driver node 107 when no signals are impressed on twisted-pair cable 103. Second impedance network 120 divides down the signal at line driver node 107 providing a signal at node 109 which is one-half that at node 107. Node 109 is coupled to a second input of first summing means 106. First summing means 106 combines the signals from node 105 and node 109 in a subtractive relation and outputs a difference signal that is substantially free from transmit signal information at node 111. In the ideal case when first impedance network 118 exactly equals the reflected impedance from transformer 126, output node 111 of first summing means 106 represents only the received signal component of the signal at node 105. Node 111 is coupled to low pass filter 122 which provides a output at node 113 substantially free of high frequency components. The output node 113 is coupled to phase equalizer 124 for reducing precursor intersymbol interference. Phase equalizer output node 115 is coupled to a first input of second summing means 108. A second input to second summing means 108 is coupled to a digital to analog (D/A) converter 114 output node 117. The second summing means 108 output node 121 is coupled to comparator 116 which quantizes the analog signal at node 121 into a digital signal suitable for digital processing at node 119. Node 119 is also coupled to a decision feedback equalizer 104 for postcursor intersymbol interference reduction. The output node 123 of the decision feedback equalizer 104 is digitally combined with the output node 125 of echo canceler 102 in third summing means 110. The digital output node 127 of third summing means 110 is coupled to D/A converter 114 for conversion to an analog signal at node 117. Input node 104 is coupled to echo canceler 102. Echo canceler 102 is not essential to the understanding of the present invention, but is described in commonly assigned U.S. Pat. No. 5,084,866, issued Jan. 28, 1992 to Kenneth G. Buttle entitled "TRANSVERSAL FILTER ECHO CAN- CELLER", and co-pending U.S. application Ser. No. 07/507,595, filed Apr. 10, 1990, to Kenneth G. Buttle, et. al., entitled "NON-LINEAR ECHO CANCELLER", both of which applications are herein incorporated by reference. Decision feedback equalizer 104 is well known in the art, and an understanding of it is also not essential to the present invention. An exemplary, but not exclusive, decision feedback equalizer is described in U.S. Pat. No. 4,789,994 issued Dec. 6, 1988, to Randall et al. entitled "ADAPTIVE EQUALIZER USING PRECURSOR ERROR SIGNAL FOR CONVERGENCE CONTROL", which patent is herein incorporated by reference.

Figure 2:
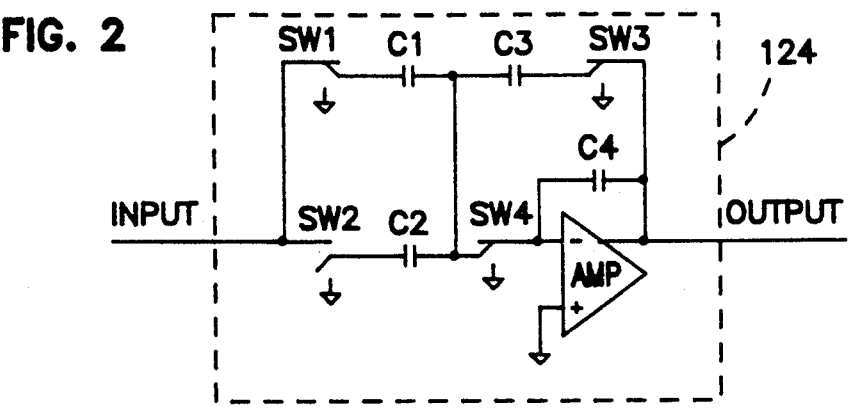
FIG. 2 is a schematic diagram of a phase equalizer implemented as a switched capacitor filter.

Referring now to the schematic illustrated in FIG. 2, a phase equalizer 124 implemented as a switched capacitor filter is shown. The z-transfer function T(z) of phase equalizer 124 has the following form:

$$T(z) = G * \frac{A - z^{-1}}{1 - B * z^{-1}}$$

where:

$$A = \frac{C1}{C2}$$
$$B = \frac{C4}{C3 + C4}$$
$$G = \frac{-C2}{C3 + C4}$$

Capacitors C1, C2, C3, and C4 in FIG. 2 are realized with unit and fractional capacitors.

Figure 3:
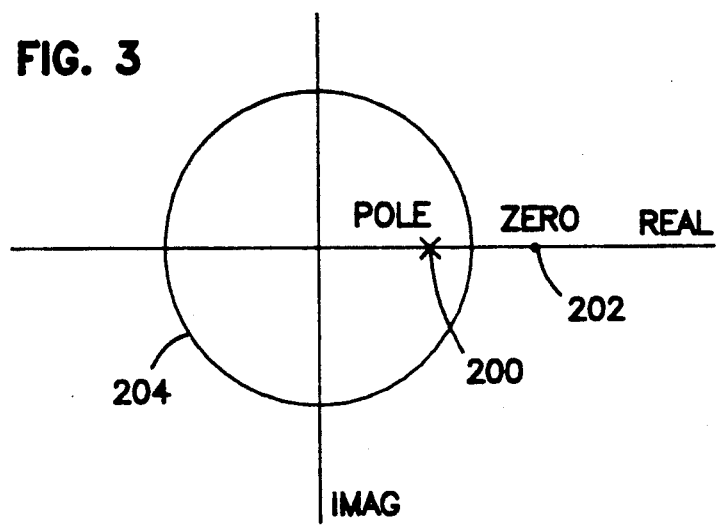
FIG. 3 is a diagram illustrating the z-domain pole and zero of a switched capacitor filter implementation of a phase equalizer.
Figure 3:
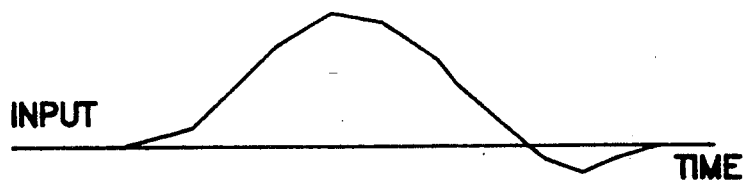

Referring to FIG. 3, the value of zero 202 corresponds to the A equation and the value of pole 200 corresponds to the B equation. The desired z-transfer function is determined by opening and closing switches SW1 through SW4 at a particular frequency along with selecting the values of capacitors C1, C2, C3, and C4. The relative values with respect to the unit circle 204 of pole 200 and zero 202 were found by experimentation on actual telephone lines and software simulations of worst case line conditions. Pole 200 and zero 202 were selected so as to minimize precursor intersymbol interference and maximize signal-to-noise ratio under the constraint of a zero crossing point occurring at baud period ($-T$). In other words, the zero crossing point of the pulse directly coincides with a precursor sample. For a worst case loop condition, the pole 200 was found to have a numerical value 0.689, the zero 202 was found to have a numerical value of 0.477 and a gain (G) having a numerical value of 0.839 while opening and closing switches SW1, SW2, SW3, and SW4 at a frequency four times the data baud. The corresponding capacitor values are: C1=5.145($C_0$), C2=10.79($C_0$), C3=4.0($C_0$), and C4=8.861($C_0$); where $C_0$ is a unit capacitor.

Figure 4:
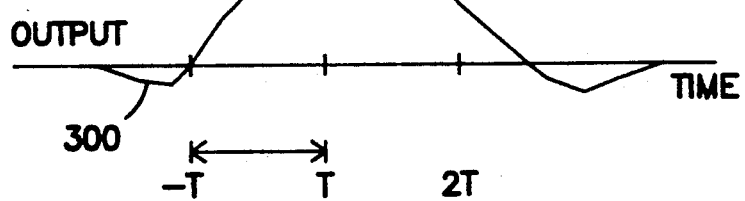
FIG. 4 is diagram illustrating an input and an output waveform of a switched capacitor filter phase equalizer in a digital subscriber loop.

FIG. 4 illustrates an input and a corresponding phase equalizer 124 output. Precursor dip 300 is induced by phase equalizer 124 to facilitate zero crossing detection at baud period ($-T$).

Figure 5A:
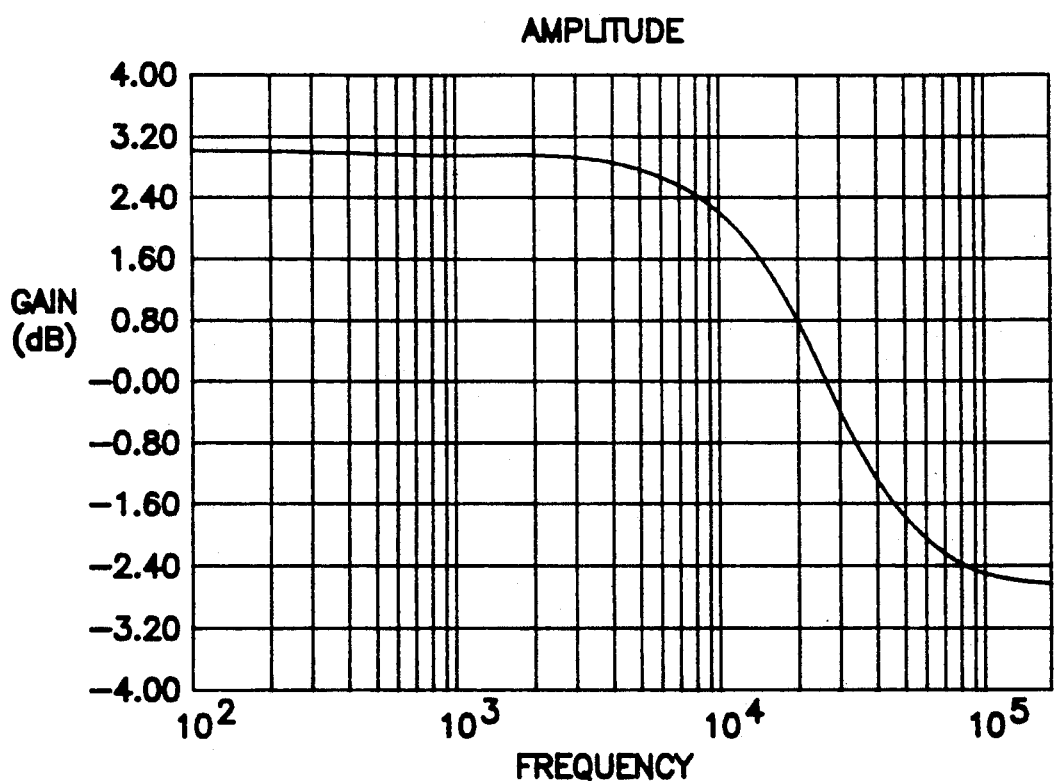
FIGS. 5A and 5B are a plot of amplitude and phase in the continuous frequency domain of a switched capacitor filter phase equalizer in a digital subscriber loop.
Figure 5B:
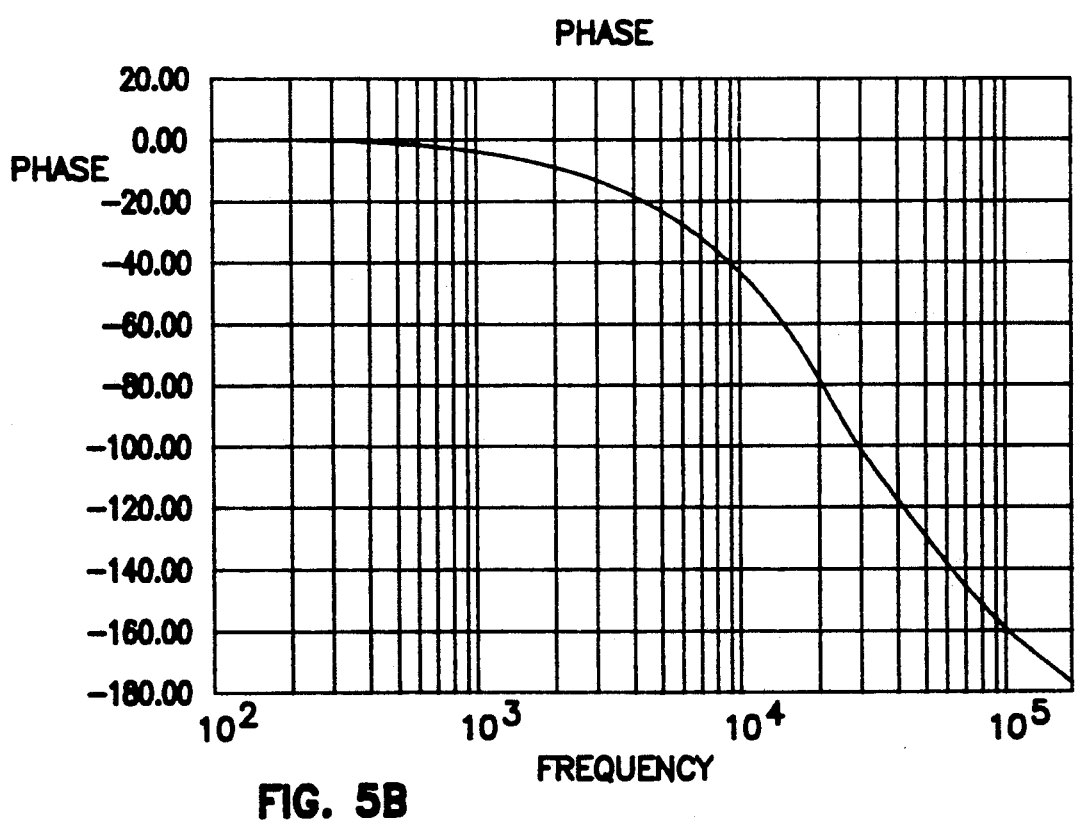

FIG. 5 illustrates amplitude and phase characteristics in the continuous frequency domain of a phase equalizer 124.

The detailed description of the preferred embodiment of the invention having been set forth herein for the purpose of explaining the principles thereof, it is known that there may be modifications, variation or change in the invention without departing from the proper scope of the invention and the claims thereto.

What is claimed is:

1. A switched capacitor filter circuit for reducing precursor intersymbol interference in a digital subscriber loop, the circuit comprising:
   (a) input means for accepting received data pulses;
   (b) filter means, coupled to the input means, for modifying phase and amplitude characteristics of the received data pulses to create phase and amplitude modified pulses, the filter means comprising a plurality of capacitor and switch pairs coupled to an amplifier to provide a z-transfer function T(z) of a form:

$$T(z) = G \times \frac{A - z^{-1}}{1 - B \times z^{-1}}$$

wherein G, A and B are fixed but adjustable coefficients; and
   (c) output means, coupled to the filter means, for outputting the phase and amplitude modified pulses.

2. A circuit as defined in claim 1, wherein the switched capacitor filter circuit is fabricated as a monolithic MOS integrated circuit.

3. A switched capacitor filter circuit for reducing precursor intersymbol interference comprising:
   (a) input means for accepting an input 2B1Q (Two Binary One Quaternary) pulse;
   (b) sampled-data means, coupled to the input means, for modifying phase and amplitude characteristics of the input 2B1Q pulse to create a modified output 2B1Q signal, and the sampled-data means comprising an operational amplifier, with at least four capacitor and switch pairs coupled thereon, for providing a z-domain transfer function of a form:

$$T(z) = 0.839 \times \frac{0.447 - z^{-1}}{1 - 0.689 \times z^{-1}}$$

(c) output means, coupled to the sampled-data means, for outputting the modified output 2B1Q pulse.

4. A method for reducing precursor intersymbol interference in a digital subscriber loop having a proximal and a distal end, the method comprising the steps of:
   (a) accepting pulses sent from the distal end of the loop;
   (b) filtering the pulses to modify phase and magnitude characteristics thereof by applying the pulses through a switched capacitor filter having a z-transfer function T(z) of a form:

$$T(z) = 0.839 \times \frac{0.477 - z^{-1}}{1 - 0.689 \times z^{-1}}$$

(c) outputting the filtered pulses in an ISDN 2B1Q format.

5. A method for reducing precursor intersymbol interference in an U-interface ISDN receiver, comprising the steps of:
   (a) accepting 2B1Q (Two Binary One Quaternary) pulses;
   (b) modifying magnitude and phase characteristics of the 2B1Q pulses through a switched capacitor filter according to a z-domain transfer function T(z):

$$T(z) = 0.839 \times \frac{0.477 - z^{-1}}{1 - 0.689 \times z^{-1}}$$

(c) outputting the modified 2B1Q pulses.

* * * * *